(12) United States Patent
Zhang et al.

(10) Patent No.: US 10,494,740 B2
(45) Date of Patent: Dec. 3, 2019

(54) DUAL-TERMINATED POLYAMIDE FOR HIGH SPEED SPINNING APPLICATION

(71) Applicant: AdvanSix Resins & Chemicals LLC, Morris Plains, NJ (US)

(72) Inventors: Yu Zhang, Shanghai (CN); Min Wang, Shanghai (CN); Shuwen Peng, Shanghai (CN); David J. Loy, North Chesterfield, VA (US); Jie Wei, Shanghai (CN); Tingzhi Chen, Shanghai (CN)

(73) Assignee: ADVANSIX RESINS & CHEMICALS LLC, Parsippany, NJ (US)

(*) Notice: Subject to any disclaimer, the term of this patent is extended or adjusted under 35 U.S.C. 154(b) by 394 days.

(21) Appl. No.: 15/388,999

(22) Filed: Dec. 22, 2016

(65) Prior Publication Data
US 2017/0183796 A1    Jun. 29, 2017

Related U.S. Application Data

(60) Provisional application No. 62/387,441, filed on Dec. 23, 2015.

(51) Int. Cl.
*D01D 5/084* (2006.01)
*D01D 5/253* (2006.01)
(Continued)

(52) U.S. Cl.
CPC ............. *D01D 5/253* (2013.01); *C08G 69/22* (2013.01); *C08G 69/48* (2013.01); *D01D 5/08* (2013.01); *D01F 6/60* (2013.01); *D10B 2331/02* (2013.01)

(58) Field of Classification Search
CPC .......... D01D 5/08; D01D 5/084; D01D 5/253; D01D 10/02; D01F 6/60
(Continued)

(56) References Cited

U.S. PATENT DOCUMENTS 5,176,926 A    1/1993   Tung
5,462,802 A *  10/1995  Mikoshiba ............. D01D 5/253
                                                          428/376
(Continued)

FOREIGN PATENT DOCUMENTS

EP    0201189 A2    11/1986
EP    1004611 A1     5/2000
(Continued)

OTHER PUBLICATIONS

Extended European Search Report issued in EP Application No. 16880109.0, dated Jun. 26, 2019, 7 pages.
(Continued)

*Primary Examiner* — Leo B Tentoni
(74) *Attorney, Agent, or Firm* — Faegre Baker Daniels LLP

(57) ABSTRACT

Methods of producing a polyamide filaments and fibers are provided. The methods include providing a dual-terminated polyamide and spinning the dual-terminated polyamide at a speed of 3500 m/min to 8000 m/min to form a fiber. In one embodiment, the polyamide has an amine endgroup concentration of 25 mmol/kg to 40 mmol/kg and a carboxyl endgroup concentration of 18 mmol/kg to 50 mmol/kg. Fibers and yarns comprising polyamide filaments and fibers formed from the method are also disclosed.

18 Claims, 18 Drawing Sheets

(51) Int. Cl.
*C08G 69/22* (2006.01)
*C08G 69/48* (2006.01)
*D01D 5/08* (2006.01)
*D01F 6/60* (2006.01)

(58) Field of Classification Search
USPC .............. 264/176.1, 177.13, 211.14, 211.17, 264/331.19
See application file for complete search history.

(56) References Cited

U.S. PATENT DOCUMENTS

| | | | |
|---|---|---|---|
| 5,814,107 | A | 9/1998 | Gadoury et al. |
| 6,051,312 | A * | 4/2000 | Arnauts ................. C08G 69/02 428/364 |
| 2002/0019513 | A1 | 2/2002 | Ilg et al. |
| 2012/0009421 | A1 | 1/2012 | Alvarez et al. |
| 2012/0177937 | A1 | 7/2012 | Ogawa et al. |
| 2015/0065648 | A1 | 3/2015 | Pineau et al. |

FOREIGN PATENT DOCUMENTS

| | | |
|---|---|---|
| JP | 2001200055 A | 7/2001 |
| KR | 100264615 B1 | 9/2000 |
| TW | 201307436 A | 2/2013 |
| WO | 2007128715 A1 | 11/2007 |

OTHER PUBLICATIONS

International Preliminary Report on Patentability issued in PCT/US2016/068390, dated Jul. 5, 2018, 11 pages.
International Search Report and Written Opinion issued in PCT/US2016/068390, dated Apr. 10, 2017, 14 pages.

* cited by examiner

70D/24F

40D/24F

70D/24F, 20 bobbins knitted together

40D/24F, 20 bobbins knitted together

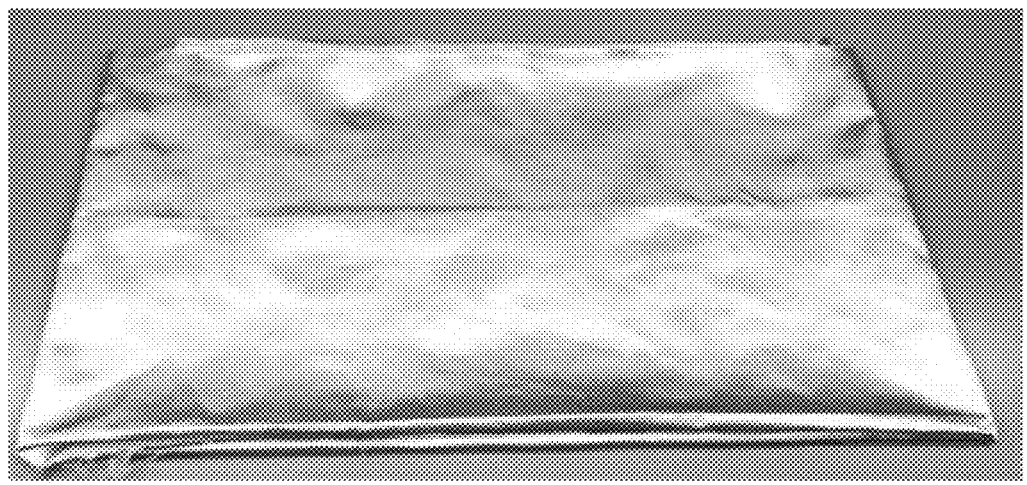
FIG. 10A
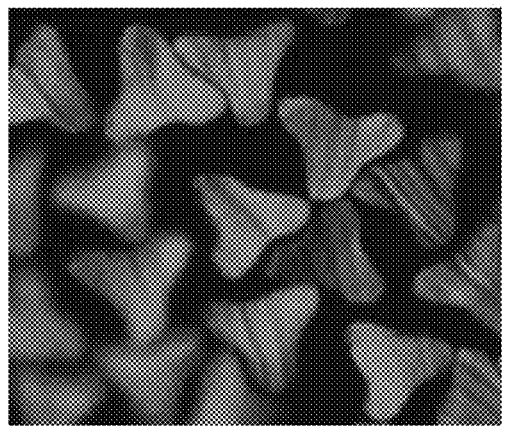 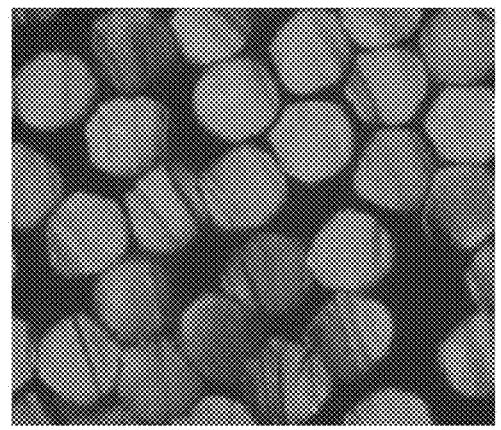
FIG. 10B   FIG. 10C

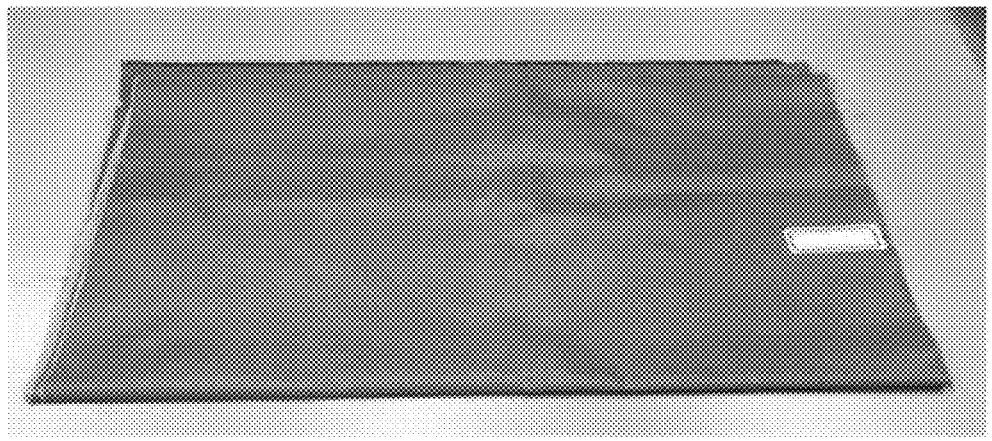
FIG. 11A
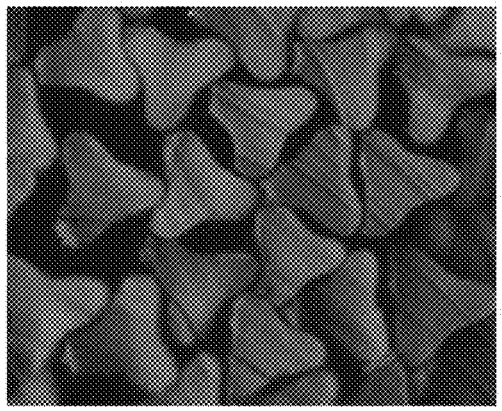 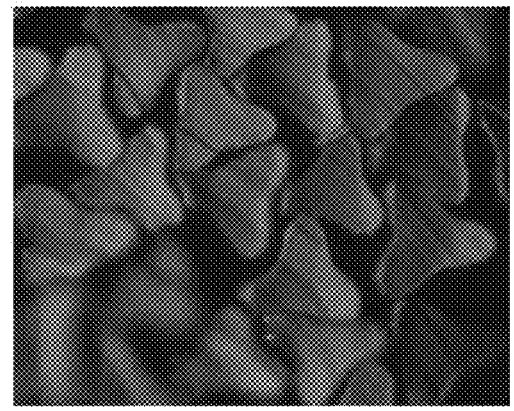
FIG. 11B     FIG. 11C

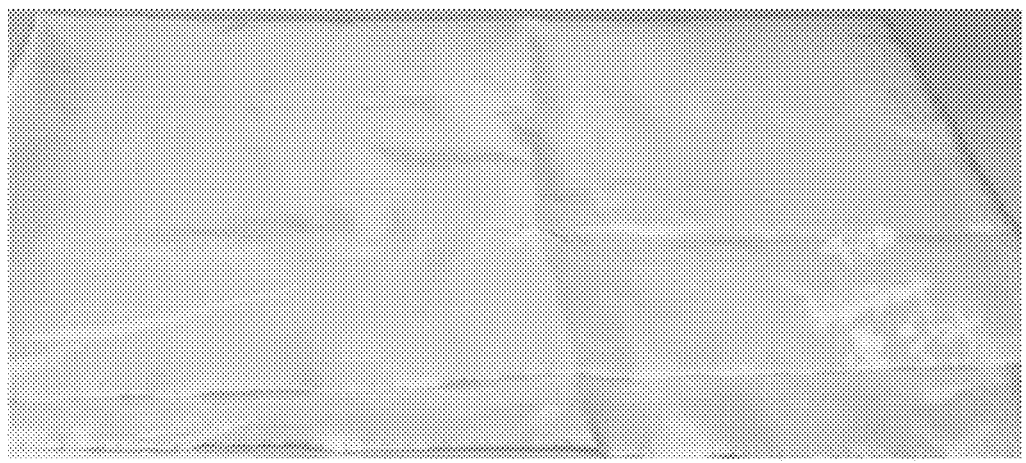
FIG. 12A
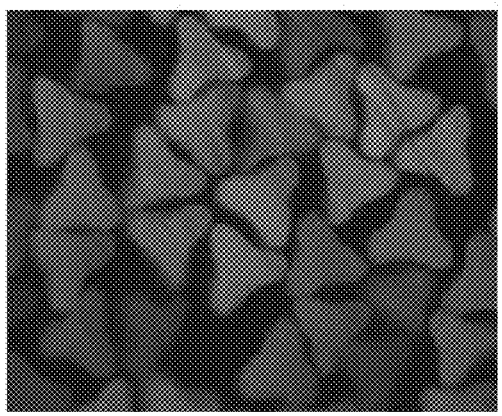 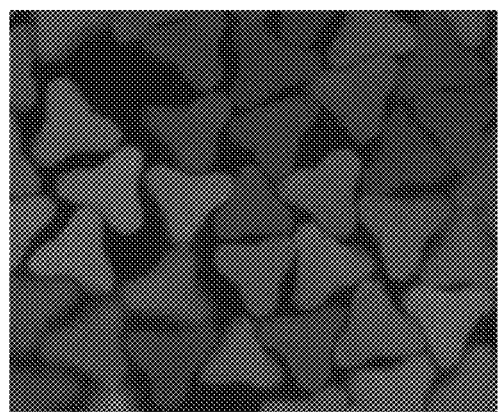
FIG. 12B    FIG. 12C

40D/12F

40D/24F

DUAL-TERMINATED POLYAMIDE FOR HIGH SPEED SPINNING APPLICATION

CROSS-REFERENCE TO RELATED APPLICATIONS

This application claims the benefit under 35 U.S.C. § 119(e) of U.S. Provisional Patent Application Ser. No. 62/387,441, filed Dec. 23, 2015, the disclosure of which is hereby incorporated by reference in its entirety.

FIELD

The present invention relates to materials, methods, and apparatus for producing polyamide materials, and in particular, fibers and filaments formed from high-speed spinning of polyamide materials.

BACKGROUND

To form a polyamide fiber material, polyamide resin, typically in the form of polyamide chips, is fed into an extruder, heated to a melt state, and pumped out through a spinneret (die) having multiple holes, also known as spinning, to form the polyamide filaments. The spun fibers, which contain the filaments, are solidified, and may be subjected to one or more drawing steps and collected on a take-up wheel. Typical polyamide materials include polyamide-6 (PA-6), polyamide-6,6 (PA-66), polyamide-666 (PA-666), polyamide-46 (PA-46), polyamide-610 (PA-610), and polyamide-1212 (PA-1212) materials.

Typical polyamide-6 materials are polymerized with mono-termination using a di-functional acid. During spinning the PA-6 material may be maintained in the melt state at about 230° C. to 300° C. for up to 5 to 45 minutes prior to being extruded from the spinneret. During this time at elevated temperature, the mono-terminated PA-6 material begins to thermally degrade, increasing the viscosity of the mono-terminated PA-6 material. The increase in viscosity leads to an increase in the spin pack pressure, which impacts the spinability and shortens the spin pack life of the mono-terminated PA-6 material. These deleterious effects may be especially seen in high speed spinning applications, such as for textiles.

Improvements in the foregoing processes are desired.

SUMMARY

The present disclosure provides fibers and filaments formed from the spinning of polyamide materials polymerized with dual termination of the amino and carboxyl end-groups, referred to herein as dual-terminated polyamides, or dual terminated PA. In one embodiment, the dual-terminated polyamide is useful in producing textiles.

In one exemplary embodiment, a method of producing a fiber is provided. The method includes providing a dual-terminated polyamide and spinning the dual-terminated polyamide at a speed of 3500 m/min to 8000 m/min to form a fiber, or in a more particular embodiment, at a speed of 4000 m/min to 6000 m/min. In one more particular embodiment, the fiber is a tri-lobal shaped fiber.

In one more particular embodiment of any of the above embodiments, the dual-terminated polyamide is selected from the group consisting of polyamide-6 (PA-6), polyamide-6,6 (PA-66), polyamide-666 (PA-666), polyamide-46 (PA-46), polyamide-610 (PA-610), polyamide-1212 (PA-1212), and mixtures and copolymers thereof. In one more particular embodiment of any of the above embodiments, the dual-terminated polyamide is selected from the group consisting of polyamide-6 (PA-6), polyamide-6,6 (PA-66), polyamide-666 (PA-666), and mixtures and copolymers thereof. In one more particular embodiment of any of the above embodiments, the dual-terminated polyamide is dual-terminated polyamide-6, referred to herein as dual-terminated PA-6.

In one more particular embodiment of any of the above embodiments, the dual-terminated PA resin has a total active endgroup concentration (amine end-groups+carboxyl end-groups) of 100 mmol/kg to 40 mmol/kg, or even more particularly 60 mmol/kg to 50 mmol/kg. In one more particular embodiment of any of the above embodiments, the dual-terminated PA-6 resin has an amine endgroup of 40 mmol/kg to 25 mmol/kg, or even more particularly 35 mmol/kg to 25 mmol/kg. In one more particular embodiment of any of the above embodiments, the dual-terminated PA resin has a carboxyl endgroup concentration of 50 mmol/kg to 18 mmol/kg, or even more particularly 30 mmol/kg to 20 mmol/kg, or still more particularly 25 mmol/kg to 20 mmol/kg.

In one more particular embodiment, the dual-terminated polyamide has a relative viscosity of 2.4 RV to 3.0 RV. In an even more particular embodiment, the dual-terminated polyamide has a relative viscosity of 2.6 RV to 3.0 RV. In another even more particular embodiment, the dual-terminated polyamide has a relative viscosity of 2.4 RV to 2.6 RV.

In one more particular embodiment of any of the above embodiments, spinning the dual-terminated polyamide-6 includes heating the dual-terminated polyamide-6 to a temperature of 230° C. to 300° C. In an even more particular embodiment, the dual-terminated polyamide-6 is held at the temperature of 230° C. to 300° C. for 5 minutes to 45 minutes.

In one more particular embodiment of any of the above embodiments, the fiber is a tri-lobal fiber. In a more particular embodiment, the fiber is formed from a spinneret having a joint arc radius between two arms, or R value, of 0 to 0.1 mm.

In one more particular embodiment of any of the above embodiments, the method further includes drawing the spun fiber. In another more particular embodiment of any of the above embodiments, the method further includes applying a dye to the fiber.

In one exemplary embodiment, a polyamide fiber is provided. The fiber is produced from a dual-terminated polyamide according to any of the above embodiments.

In one exemplary embodiment, a yarn is provided. The yarn is produced by forming a plurality of fibers from a dual-terminated polyamide according to any of the above embodiments, followed by forming the yarn from the plurality of fibers.

The above mentioned and other features of the invention, and the manner of attaining them, will become more apparent and the invention itself will be better understood by reference to the following description of embodiments of the invention taken in conjunction with the accompanying drawings.

BRIEF DESCRIPTION OF THE DRAWINGS

FIGS. 10A-10C are related to Example 3 and illustrate a yellow satin 40/24 fabric formed from a dual-terminated PA-6 material.

FIGS. 11A-11C are related to Example 3 and illustrate a gray plain 70/24 fabric formed from a dual-terminated PA-6 material.

FIGS. 12A-12C are related to Example 3 and illustrate a pink plain 40/24 fabric formed from a dual-terminated PA-6 material.

Corresponding reference characters indicate corresponding parts throughout the several views. The exemplifications set out herein illustrate exemplary embodiments of the invention and such exemplifications are not to be construed as limiting the scope of the invention in any manner.

DETAILED DESCRIPTION

Although the fibers and filaments exemplified below are formed from dual-terminated PA-6 material, the disclosure is not intended to be limited to only dual-terminated PA-6 materials. Fibers and filaments according to the present disclosure may also be formed from other dual terminated polyamides, including, for example, polyamide-6 (PA-6), polyamide-6,6 (PA-66), polyamide-666 (PA-666), polyamide-46 (PA-46), polyamide-610 (PA-610), polyamide-1212 (PA-1212), and mixtures and copolymers thereof.

Although not so limited, the dual-terminated PA material described herein is particularly useful in forming yarn for textiles.

Figure 1A:
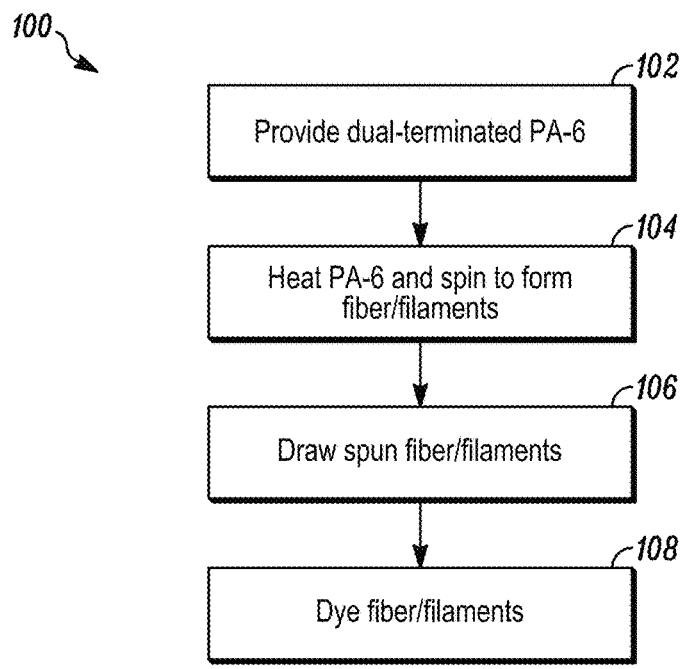
FIG. 1A illustrates an exemplary method of producing fibers or filaments.

Referring first to FIG. 1A, an exemplary method 100 of producing spun fibers is illustrated. As shown in block 102, a dual terminated-PA-6 resin is provided. An exemplary system 120 for producing a fiber is provided in FIG. 1B. The dual-terminated PA-6 resin includes different terminators for the amine ($—NH_2$) end groups and carboxyl ($—COOH$) end-groups of the PA-6 resin. In one exemplary embodiment, the different terminators are chemically distinct. Exemplary amine terminators include acidic terminators such as mono-functional acids, and exemplary carboxyl terminators include amine terminators such as mono-functional amines. Dual-terminated PA-6 resin may be produced by adding two separate terminators during the polyamide polymerization process to terminate the amine and carboxyl end groups. An acidic terminator is used to terminate the $NH_2$ amine end groups, and an amine terminator is used to terminate the $—COOH$ carboxyl end groups of the PA-6 resin. Increased levels of terminator additions lowers the end group levels of amine and carboxyl end groups, which achieves increased polymer melt stability. Exemplary PA-6 resins include dual-terminated nylon 6 resins available from Honeywell International, Inc., Morristown, N.J.

The PA-6 material includes both amine endgroups and carboxyl end-groups.

The amine endgroup concentration can be determined by the amount of p-toluenesulfonic acid (PTSA) needed to titrate a sample of the polyamide in 68% phenol/32% methanol according to the formula:

$$\frac{(\text{mL } PTSA \text{ to titrate sample} - \text{mL } PTSA \text{ to titrate blank}) \times (\text{Normality of } PTSA) \times 1000}{1/2 \times \text{Sample weight (g)}}$$

In one exemplary embodiment, the dual-terminated PA-6 resin has an amine endgroup concentration as great as 40 mmol/kg, 37 mmol/kg, 35 mmol/kg, 32 mmol/kg, as little as 30 mmol/kg, 27 mmol/kg, 25 mmol/kg, or lower, or within any range defined between any two of the foregoing values, such as 40 mmol/kg to 25 mmol/kg, 35 mmol/kg to 25 mmol/kg, or 35 mmol/kg or lower.

The carboxyl endgroup concentration can be determined by the amount of potassium hydroxide (KOH) needed to titrate a sample of the polyamide in benzyl alcohol according to the formula:

$$\frac{(\text{mL } KOH \text{ to titrate sample} - \text{mL } KOH \text{ to titrate blank}) \times (\text{Normality of } KOH) \times 1000}{\text{Sample weight (g)}}$$

In one exemplary embodiment, the dual-terminated PA-6 resin has a carboxyl endgroup concentration as great as 50 mmol/kg, 40 mmol/kg, 30 mmol/kg, 25 mmol/kg, as little as 22 mmol/kg, 20 mmol/kg, 18 mmol/kg, or lower, or within any range defined between any two of the foregoing values, such as 50 mmol/kg to 18 mmol/kg, 30 mmol/kg to 20 mmol/kg, 25 mmol/kg to 20 mmol/kg, or 25 mmol/kg or lower. In one exemplary embodiment, the dual-terminated PA-6 resin has a total endgroup concentration (amine endgroups+carboxyl endgroups) as great as 100 mmol/kg, 80 mmol/kg, 60 mmol/kg, 55 mmol/kg, as little as 50 mmol/kg, 45 mmol/kg, 40 mmol/kg or lower, or within any range defined between any two of the foregoing values, such as 100 mmol/kg to 40 mmol/kg, 60 mmol/kg to 50 mmol/kg, or 65 mmol/kg or lower.

In one exemplary embodiment, the dual-terminated PA-6 resin has a relative viscosity (RV), according to GB/T 12006.1-2009/ISO 307:2007 is as little as 2.4 RV, 2.45 RV, 2.5 RV, 2.55 RV, 2.6 RV, as great as 2.65 RV, 2.7 RV, 2.75 RV, 2.8 RV, 2.85 RV, 2.9 RV, 2.95 RV, 3.0 RV or within any range defined between any two of the foregoing values, such as 2.4 RV to 3.0 RV, 2.4 RV to 2.6 RV, or 2.6 RV to 3.0 RV. In some applications, such as for a tri-lobal textile fiber, a relatively high molecular relative viscosity such as 2.6 RV or higher, 2.65 RV to 3.0 RV, or 2.7 RV to 3.0 RV, corresponding to a relatively high molecular weight, may provide improved dimensional stability.

In one exemplary embodiment, the dual-terminated PA-6 resin has a formic acid viscosity (FAV), according to ASTM D-789 is as little as 35 FAV, 40 FAV, 45 FAV as high as 50 FAV, 55 FAV, 60 FAV, 65 FAV or within any range defined between any two of the foregoing values, such as 35 FAV to 65 FAV, 35 FAV to 50 FAV, or 55 FAV to 65 FAV.

In one exemplary embodiment, the dual-terminated PA-6 resin has a relatively narrow molecular weight distribution. In one exemplary embodiment, the polydispersity index, defined as the ratio of the weight average molecular weight to the number average molecular weight ($M_w/M_n$) is as great as 2.0, 1.95, 1.9, as little as 1.85, 1.8, 1.75, 1.7, or less, or within any range defined between any two of the foregoing values, such as 2.0 to 1.7, 1.9 or less, 1.85 to 1.75, or 1.8 or less. In one exemplary embodiment, the polydispersity index is less than 1.8.

In one exemplary embodiment, the dual-terminated PA-6 resin has a relatively low extractable content according to ISO 6427. In one exemplary embodiment, the extractable content is as great as 0.8 wt. %, 0.7 wt. %, 0.65 wt. %, as little as 0.6 wt. %, 0.55 wt. %, 0.5 wt. %, 0.4 wt. %, or less, or within any range defined between any two of the foregoing values, such as 0.8 wt. % to 0.4 wt. %, 0.65 wt. % to 0.5 wt. %, or 0.8 wt. % or less. In one exemplary embodiment, the extractable content is less than 0.6 wt. %.

In one exemplary embodiment, the dual-terminated PA-6 resin has a relatively low moisture level according to ASTM D-6869. In one exemplary embodiment, the moisture level is as great as 1200 ppm, 1000 ppm, 800 ppm, 700 ppm, as little as 600 ppm, 500 ppm, 400 ppm, or less, or within any range defined between any two of the foregoing values, such as 1200 ppm to 400 ppm, 700 ppm to 400 ppm, or 600 ppm or less. In one exemplary embodiment, the extractable content is less than 600 ppm.

Figure 1B:
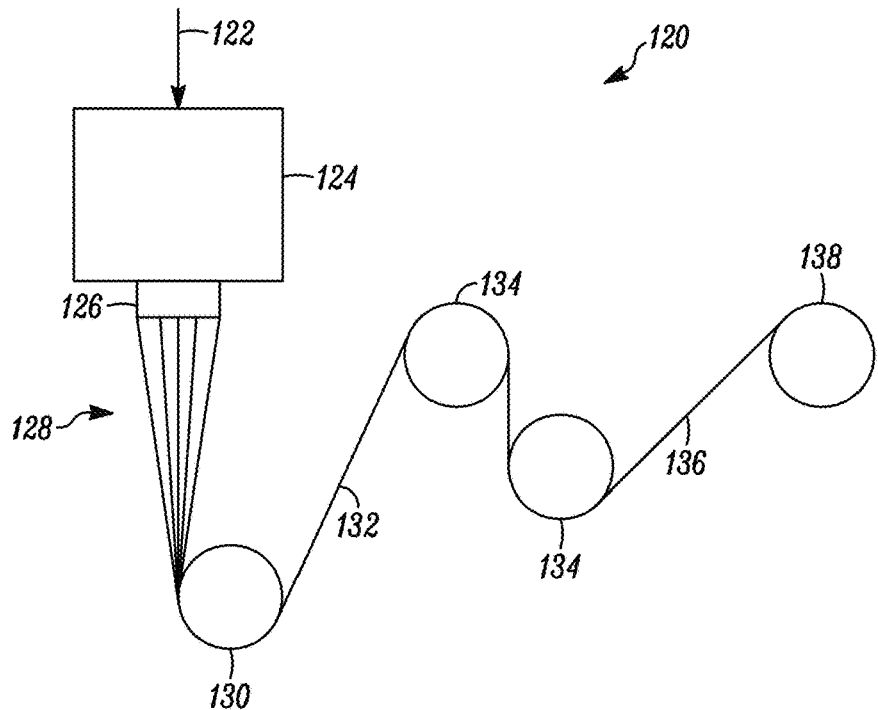
FIG. 1B illustrates an exemplary system for producing fibers or filaments.
Figure 2:
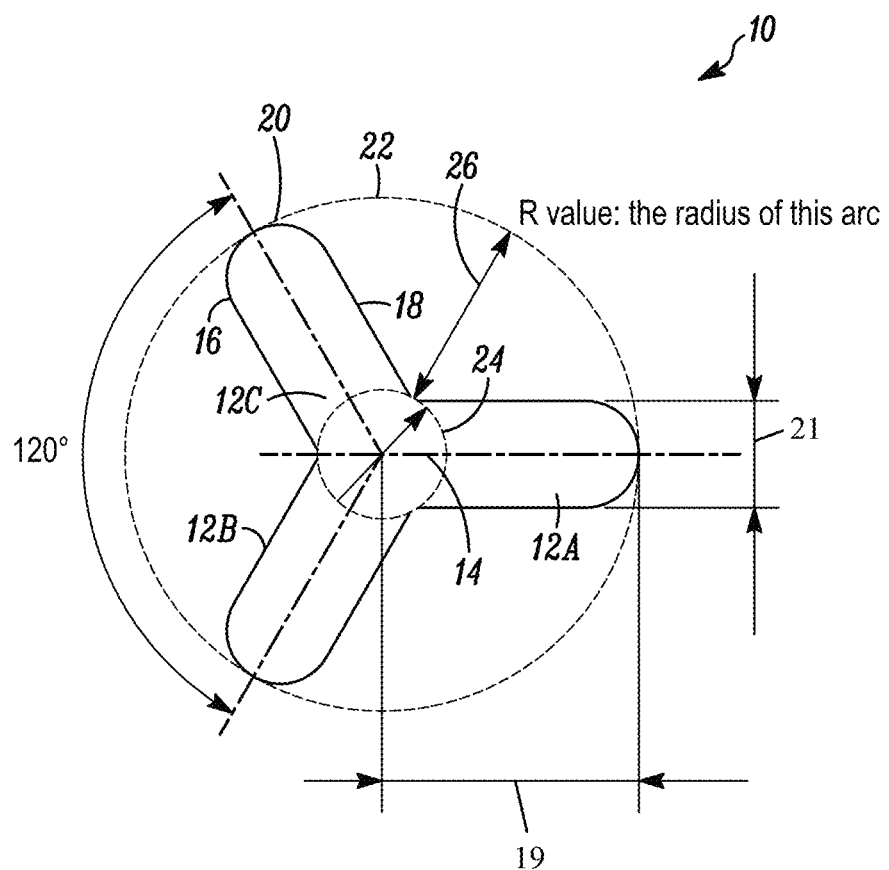
FIG. 2 illustrates an exemplary spinneret outlet with an arm joint arc radius of about 0 mm to 0.2 mm.

As illustratively shown in FIG. 1B, the dual-terminated PA-6 resin is illustratively provided as a feed 122 to a hopper 124, then melted in the extruder and pumped out through the spinneret 126. Referring next to FIG. 1A in block 104, the dual-terminated PA-6 resin is heated and spun into a fiber. In an exemplary embodiment, the heated PA-6 resin is spun using a spinneret 126 (FIG. 1B). A spinneret illustratively includes one or more outlets for forming individual fibers 128. An exemplary outlet 10 for forming a tri-lobal fiber is provided in FIG. 2. As shown in FIG. 2, the tri-lobal outlet comprises three arms 12A, 12B, 12C extending from a center 14.

Each arm 12 defines first side 16 and second side 18, terminating in tip 20. Arms 12 each include a width 21 defined by the distance between first side 16 and second side 18 as shown in FIG. 2. In one exemplary embodiment, width 21 is as little as 0.08 mm, 0.09 mm, 0.1 mm, as great as 0.13 mm, 0.14 mm, 0.15 mm, or within any range defined between any two of the foregoing values, such as 0.08 mm to 0.15 mm, 0.09 mm to 0.14 mm, or 0.1 mm to 0.13 mm. In one exemplary embodiment, first side 16 and second side 18 are parallel. In another exemplary embodiment, first side 16 and second side 18 are angled to decrease the width 21 of arm 12 between the center 14 and tip 20.

In one exemplary embodiment, the outlet 10 includes the joint arc radius 26 between two arms, also referred to as the R value. In one exemplary embodiment, the R value may be as little as 0 mm, 0.005 mm, 0.01 mm, 0.02 mm, 0.025 mm, 0.03 mm as great as 0.05 mm, 0.08 mm, 0.09 mm, 0.1 mm or within any range defined between any two of the foregoing values, such as 0 mm to 0.1 mm, 0.01 mm to 0.05 mm, 0.02 mm to 0.05 mm, or 0.02 mm to 0.03 mm.

In one exemplary embodiment, tip 20 is substantially rounded. In one exemplary embodiment, tip 20 has a radius that may be as little as, 0.03 mm, 0.035 mm, 0.04 mm, as great as 0.055 mm, 0.06 mm, 0.065 mm, or within any range defined between any two of the foregoing values, such as 0.03 mm to 0.06 mm, 0.035 mm to 0.055 mm, 0.04 mm to 0.065 mm.

As illustrated in FIG. 2, the spinneret outlet defines an outer circumference 22 circumscribing the arms 12A, 12B, and 12C and an inner circumference 24 about center 14. In one exemplary embodiment, the outer circumference has a radius 19 as little as 0.2 mm, 0.22 mm, 0.25 mm, as great as 0.3 mm, 0.31 mm, 0.32 mm, or within any range defined between any two of the foregoing values, such as 0.2 mm to 0.32 mm, 0.22 mm to 0.31 mm, or 0.25 mm to 0.3 mm.

Figure 3B:
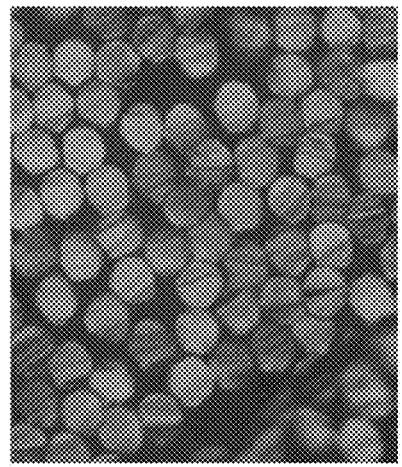
FIG. 3B illustrates fibers formed from an exemplary round spinneret.
Figure 3D:
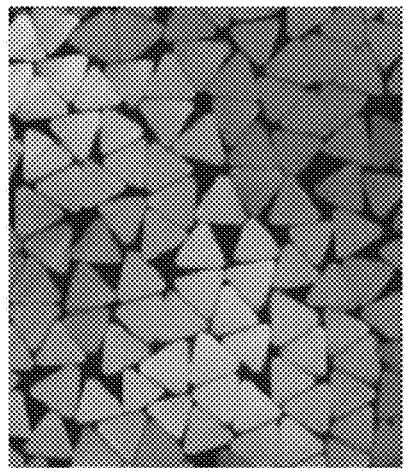
FIG. 3D illustrates fibers formed from an exemplary tri-lobal spinneret with an arm joint arc radius of about 0.1 mm to 0.2 mm.
Figure 3A:
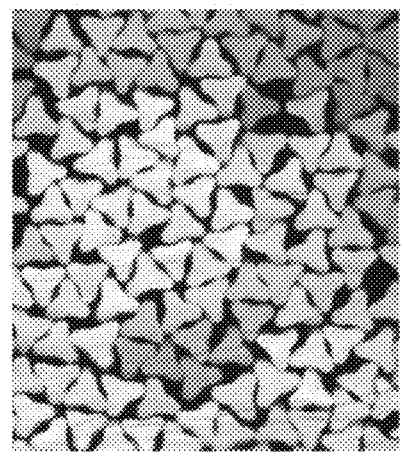
FIG. 3A illustrates fibers formed from an exemplary tri-lobal spinneret with an arm joint arc radius of about 0 to 0.1 mm.

An end-view of illustrative fibers 20 formed from a tri-lobal spinneret with an arm joint arc radius from 0 to 0.1 mm is shown in FIG. 3A.

Figure 3C:
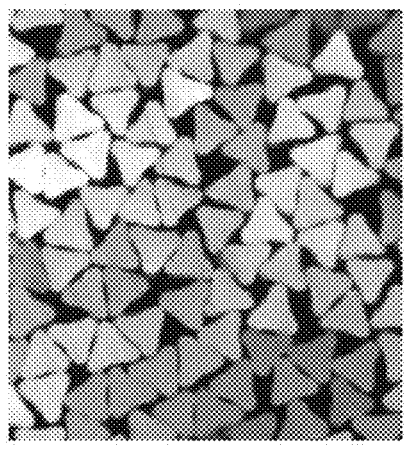
FIG. 3C illustrates fibers formed from an exemplary tri-lobal spinneret with an arm joint arc radius of about 0.05 mm to 0.15 mm.

In another embodiment, the spinneret includes one or more outlets for forming a round, triangular, or concave triangular fiber. Illustrative fibers 22 formed from a round spinneret are shown in FIG. 3B. Illustrative fibers 24 formed from a tri-lobal spinneret with arm joint arc radius from 0.05 to 0.15 mm are shown in FIG. 3C. Illustrative fibers 24 formed from a tri-lobal spinneret with arm joint arc radius from 0.1 mm to 0.2 mm are shown in FIG. 3D.

In one exemplary embodiment, the dual-terminated PA-6 resin is heated to a temperature as little as 230° C., 235° C., 240° C., 245° C., 250° C., as high as 285° C., 290° C., 295° C., 300° C., or higher, or within any range defined between any two of the foregoing values, such as 230° C. to 285° C., 255° C. to 285° C., or 260° C. to 300° C. In a more particular embodiment, the dual-terminated PA-6 resin may be maintained at the above temperature for a time as 5 minutes, 10 minutes, 15 minutes, as great as 30 minutes, 40 minutes, 45 minutes, or greater, or within any range defined between any two of the foregoing values, such as 5 minutes to 40 minutes or 10 minutes to 30 minutes.

In one exemplary embodiment, the dual-terminated PA-6 resin is thermally stable at relatively high temperatures, such as temperatures as low as 260° C., 265° C., 270° C., as high as 275° C., 280° C., or higher, or within any range defined between any two of the foregoing values, such as 260° C. to 280° C.

In one exemplary embodiment, the dual-terminated PA-6 resin can be spun at relatively high speeds. In one exemplary embodiment, the dual-terminated PA-6 resin is spun at speeds 3500 m/min, 4000 m/min, 4500 m/min, as high as 6000 m/min, 7000 m/min, 8000 m/min, or within any range defined between any two of the foregoing values, such as 3500 m/min to 6000 m/min, or 4000 m/min to 6000 m/min.

In one exemplary embodiment, the spun PA fiber is of high quality. In one exemplary embodiment, a percentage of best quality yarn, (AA %), is determined by the following formula, on condition that the dyeing uniformity is good:

AA %=(number of full bobbins)×(weight of each full bobbin)/(weight of total material fed to spin)

The top quality rating is a rating of "AA" is as determined by the China textile industry standards. The number of full bobbins refers the number of bobbins that reach a predetermined weight (such as 6 kg) without experiences a fiber or filament break during spinning to this weight. If a fiber breaks before the bobbin reaches its full weight, then the bobbin is classified as a rating of "A", not "AA". In one exemplary embodiment, the spun fiber has an AA % as great as 100%, 99%, 97.5%, as low as 95%, 92.5%, 90%, 85%, or within any range defined between any two of the foregoing values, such as 85% to 100%, 90% to 100%, or 95% to 100%.

As shown in the illustrative embodiment of FIG. 1B, the individual fibers 128 may be collected 132 and drawn over one or more drawing rollers 134 before the resulting fibers 136 are collected in a wind-up bobbin 138. Referring again to FIG. 1A, in block 106, the spun fiber may be subjected to one or more drawing steps. In an exemplary embodiments, the fiber may be totally drawn (from spinneret to wind-up) as little as 300%, 350%, 400%, as great as 600%, 650%, 700%, or within any range defined between any two of the foregoing values, such as 300% to 700% or 400% to 600%. The ratio is the total draw ratio for the fibers, from spinneret to wind-up. In one exemplary embodiment, the fibers 136 have an elongation as little as 10%, 20%, 25%, as great as 50%, 60%, 70%, or within any range defined between any two of the foregoing values, such as 10% to 70%.

In block 106, the spun fibers are wound up to form a bobbin. In an exemplary embodiment, each fiber may contain as little as 3, 6, 12, or as great as 48, 72, 96, filaments, or within any range defined between any two of the foregoing values, such as 12 to 48. The fibers may have a total denier as great little as 20, 30, as great as 350, 400, or within any range defined between any two of the foregoing values, such as 30 to 150. The denier per filament may be as little as 1.5, 1.7, 2, as great as 3, 4, 5, or within any range defined between any two of the foregoing values, such as 1.5 to 5, 1.7 to 5, or 1.7 to 3.

In block 108, spun fiber may dyed. Exemplary dyes include acid dyes, such as Neutral Grey-2BL, Neutral Blue-BNL, Erionyl Red, and Lanaset Blue-2R.

EXAMPLES

Example 1

Thermal Stability of Various PA-6 Materials

PA materials from various sources were tested for thermal stability. The resins tested are provided in Table 1 below, along with the Formic Acid Viscosity (FAV), total active endgroup concentration, and amine ($NH_2$) and carboxyl (COOH) endgroup concentration.

TABLE 1

PA-6 resins for thermal stability

| Resin | Termination type | FAV | Total EG mmol/kg | [$NH_2$] EG mmol/kg | [COOH] EG mmol/kg |
|---|---|---|---|---|---|
| Comparative Resin 1 (low RV) | Mono-terminated (di-functional acid) | 39.0 | 120.5 | 44.4 | 76.1 |
| Comparative Resin 2 (low RV) | Mono-terminated (di-functional acid) | 41.2 | 124 | 47.0 | 77.0 |
| Comparative Resin 3 (low RV) | Mono-terminated (di-functional acid) | 40.5 | 115.6 | 44.6 | 71.0 |
| Comparative Resin 4 (low RV) | None | 40 | 139.7 | 68 | 71.7 |
| Comparative Resin 5 (low RV) | Mono-terminated (di-functional acid) | 35.0 | 117.0 | 44 | 73 |
| Comparative Resin 6 (low RV) | Mono-terminated (di-functional acid) | 39.0 | 121 | 45 | 76 |
| Example Resin 7 (low RV) | Dual-terminated (mono-functional acid, mono-functional amine) | 46.4 | 59.6 | 34.9 | 24.7 |
| Example Resin 8 (high RV) | Dual-terminated (mono-functional acid, mono-functional amine) | 61.3 | 49.3 | 27.4 | 21.9 |
| Comparative Resin 9 (high RV) | Mono-terminated (di-functional acid) | 58.9 | 105.5 | 44.6 | 60.9 |

Each PA resin was held at a temperature of 260° C. for 60 minutes. A viscosity measurement was taken every 2 minutes starting at 15 minutes using a rheology test. The results are provided in FIG. 4.

Figure 4:
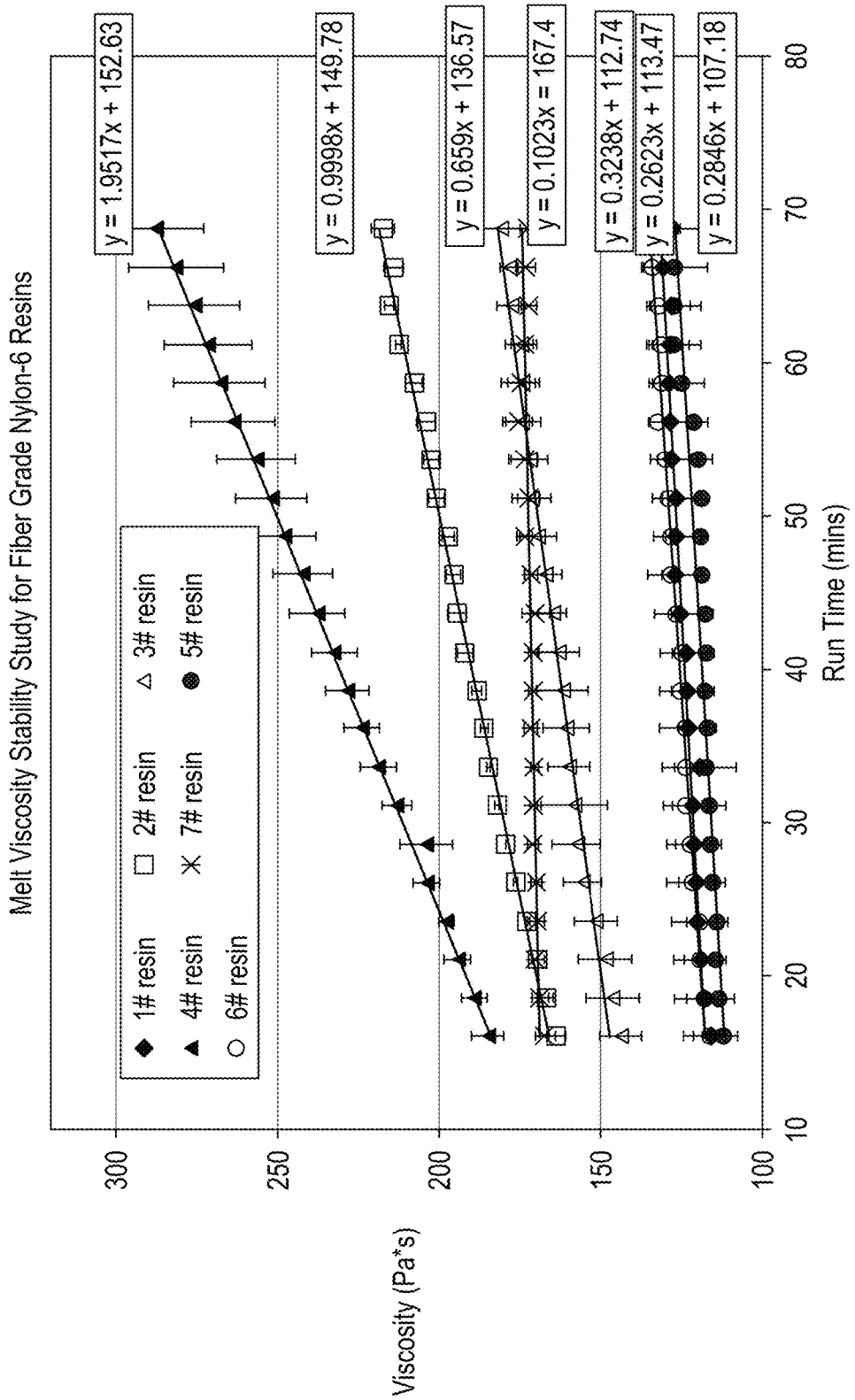
FIG. 4 is related to Example 1 and illustrates the melt viscosity stability for various PA-6 resins.
Figure 5A:
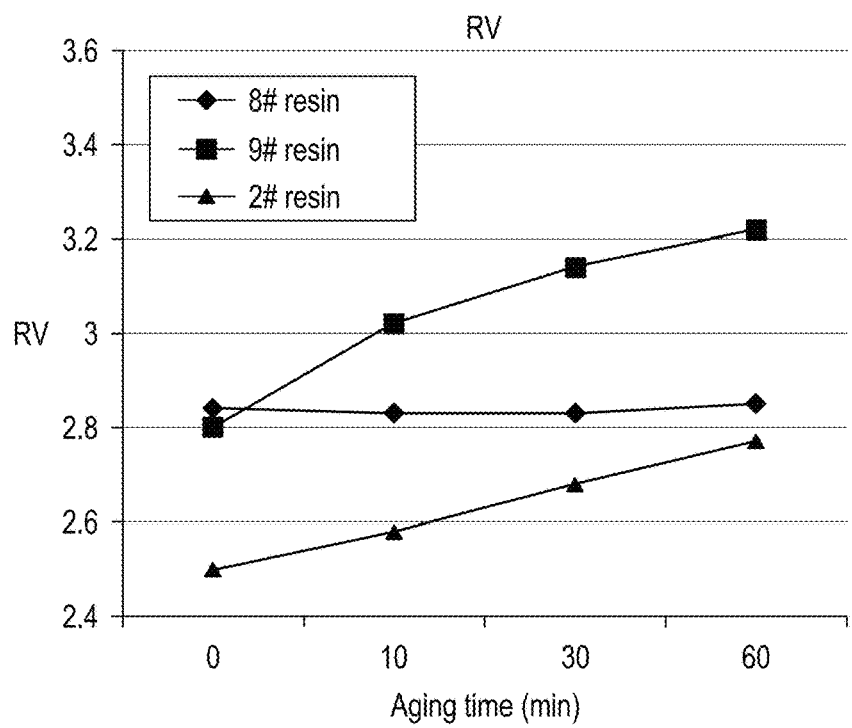
FIG. 5A is related to Example 1 and illustrates the relative viscosity thermal stability for various PA-6 resins.
Figure 5B:
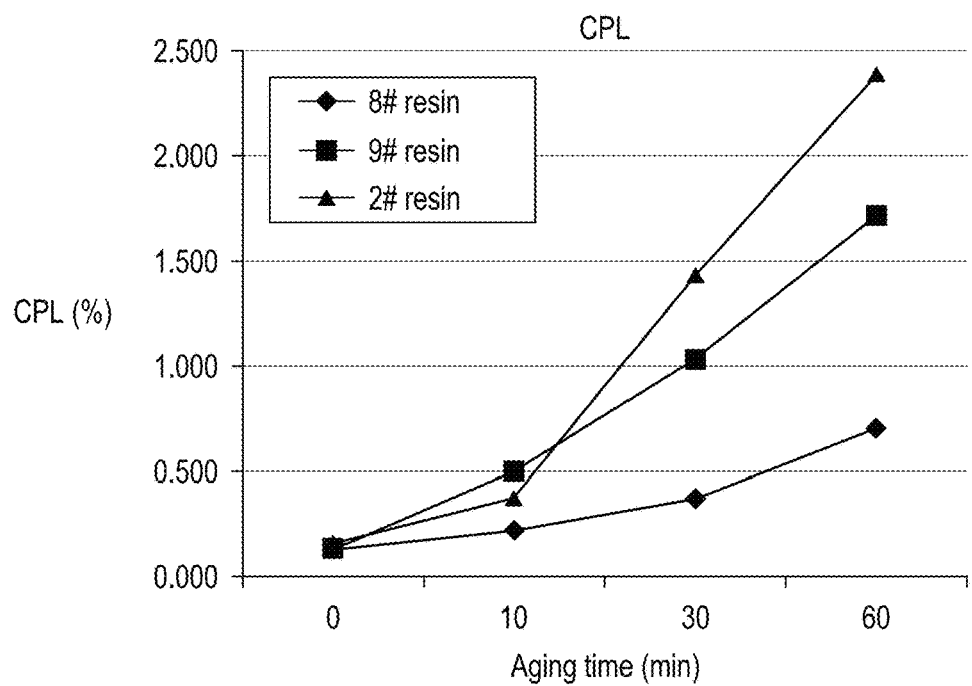
FIG. 5B is related to Example 1 and illustrates the % caprolactam thermal stability for various PA-6 resins.
Figure 5C:
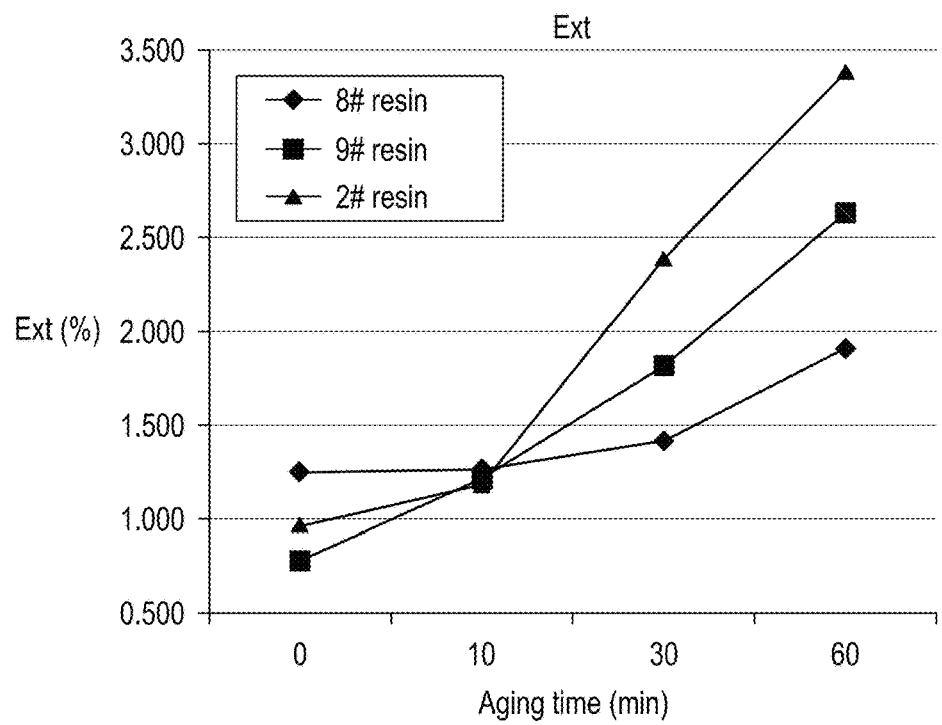
FIG. 5C is related to Example 1 and illustrates the % extractable thermal stability for various PA-6 resins.
Figure 5D:
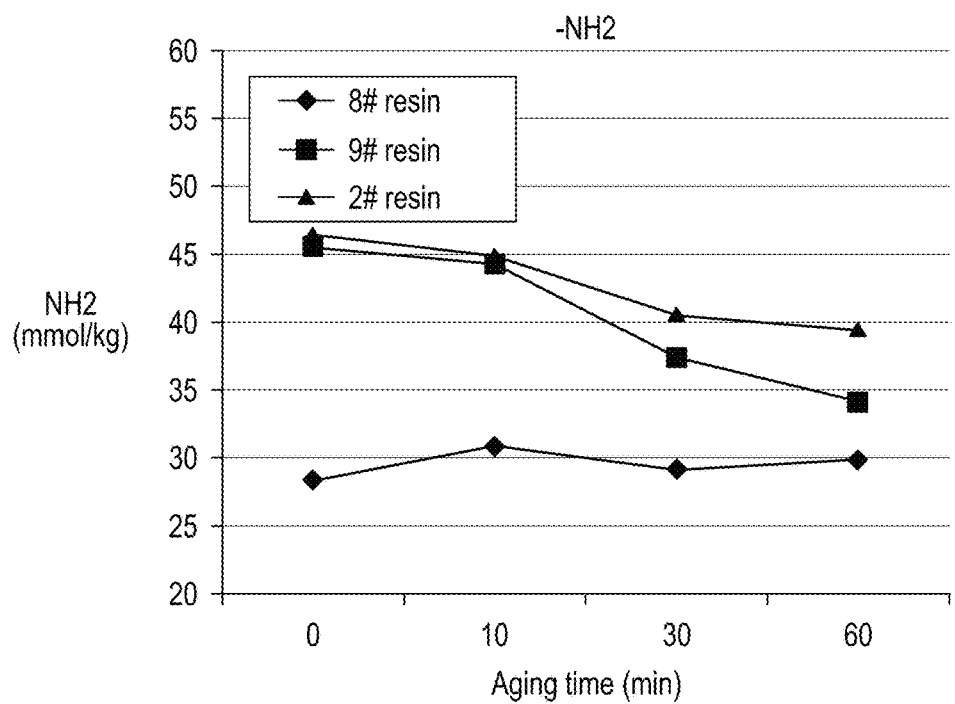
FIG. 5D is related to Example 1 and illustrates the amino endgroup concentration thermal stability for various PA-6 resins.
Figure 5E:
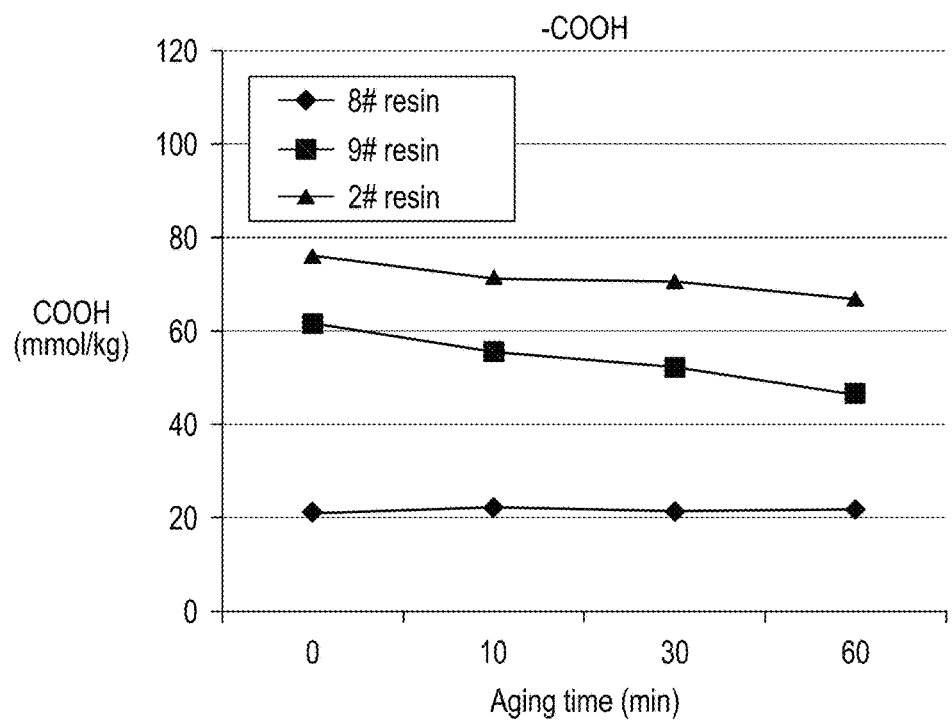
FIG. 5E is related to Example 1 and illustrates the carboxyl endgroup concentration thermal stability for various PA-6 resins.
Figure 5F:
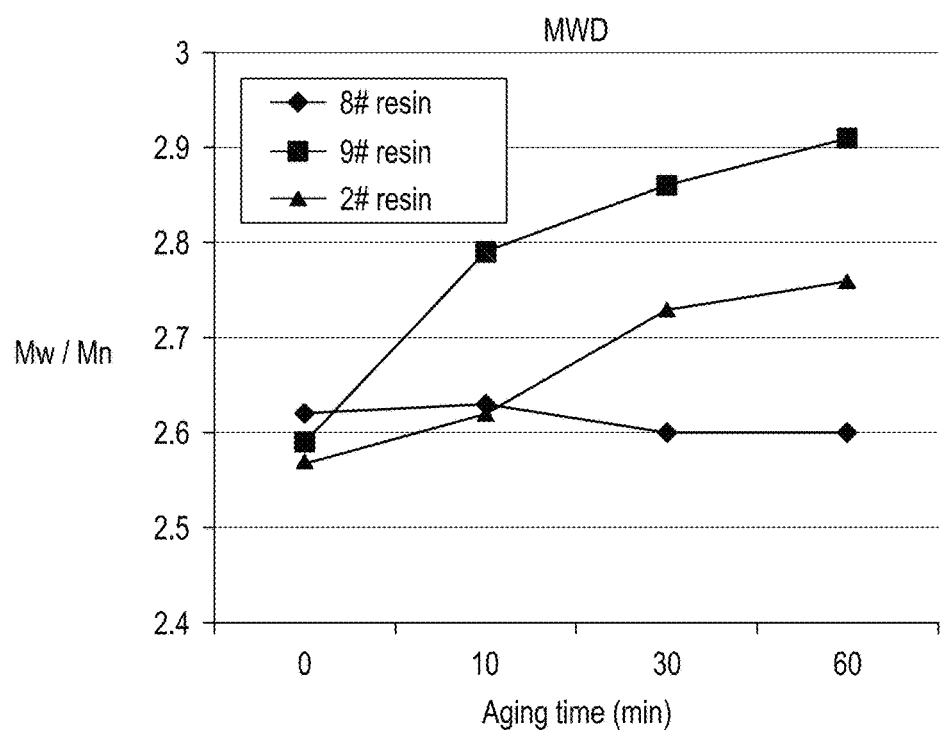
FIG. 5F is related to Example 1 and illustrates the molecular weight distribution for various PA-6 resins.

As shown in FIG. 4, the dual-terminated PA-6 resins had relatively little increase in viscosity during the duration of the test compared to the mono-terminated PA-6 resins.

Samples of the mono-terminated low RV Comparative Resin 2# and high RV Comparative Resin 9# and dual-terminated high RV Example Resin 8# were aged at 265° C. in the injection molding equipment, staying for 0, 10, 30, and 60 minutes. Bars then were formed, we sealed the bar in the aluminum foil bag before test. All the tests shown in FIG. 5 performed under 23° C., 50 RH in lab. The relative viscosity, % caprolactam, % extractable, —$NH_2$ and —COOH end group concentrations, and molecular weight distribution were determined for each sample. The results are provided in FIGS. 5A-5F.

As shown in FIGS. 5A-5F, the dual-terminated Example 8# material had relatively little change in properties over the tested time period compared to the mono-terminated low RV and high RV Comparative Example 2# and 9#. This supports the dual-terminated PA material being more thermally stable than either of the tested mono-terminated PA materials, and better to use for high speed spinning.

Figure 6:
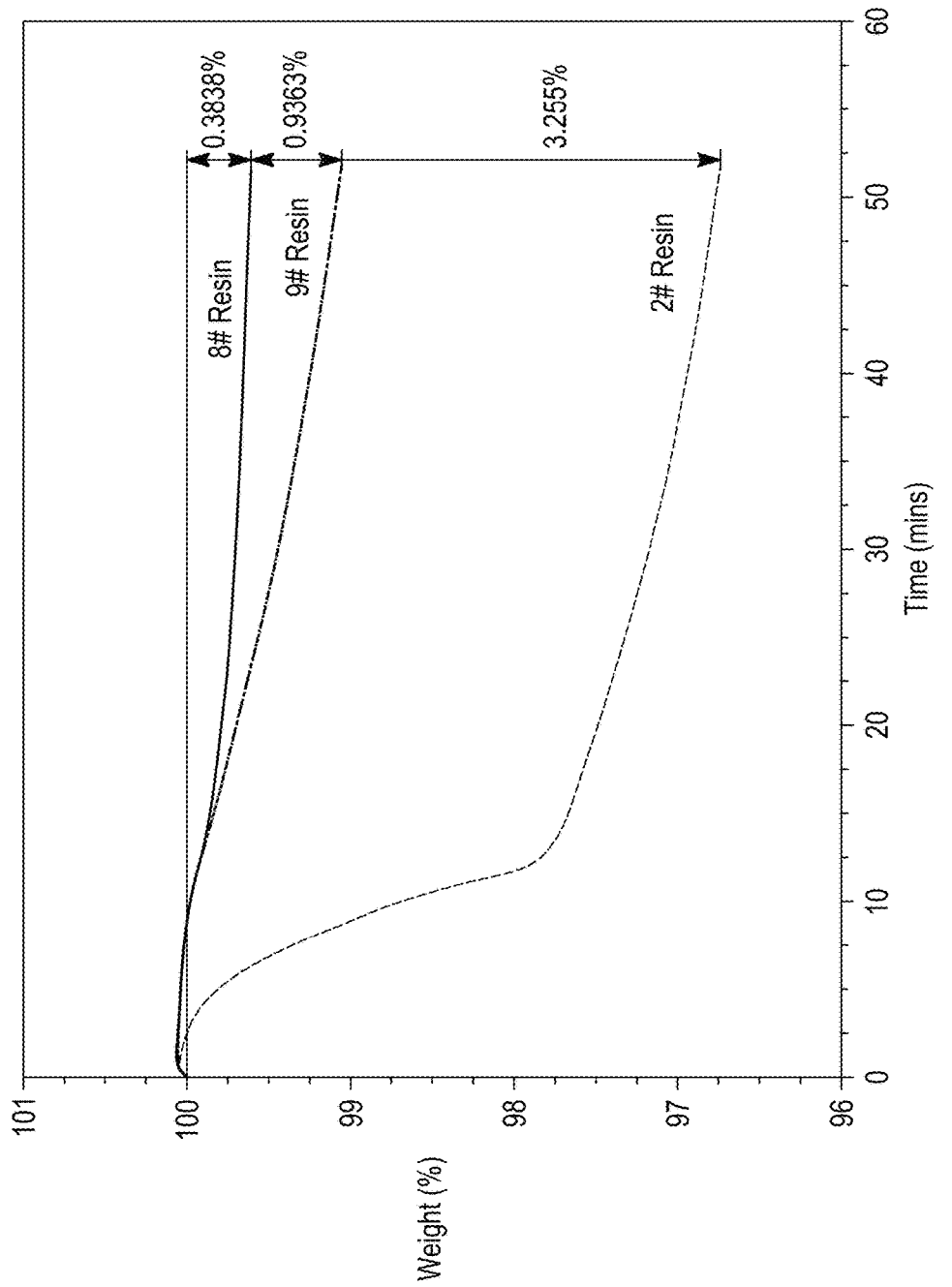
FIG. 6 is related to Example 1 and illustrates the TGA thermal stability of various PA-6 resins.

The mono-terminated Comparative Resins 2# and 9# and dual-terminated Example Resin 8# were then tested using Thermal Gravimetric Analysis (TGA) under nitrogen gas from room temperature to 265° C. at a temperature rise of 20° C./min. The results are shown in FIG. 6. As shown in FIG. 6, the dual-terminated Example Resin 8# material experienced only 0.38% weight loss, while the mono-terminated Comparative Example 2# experienced 3.26% weight loss and the mono-terminated Comparative Example 9# experienced 0.94% weight loss. This supports the dual-terminated PA material being more thermally stable than either of the tested mono-terminated PA materials.

Figure 7:
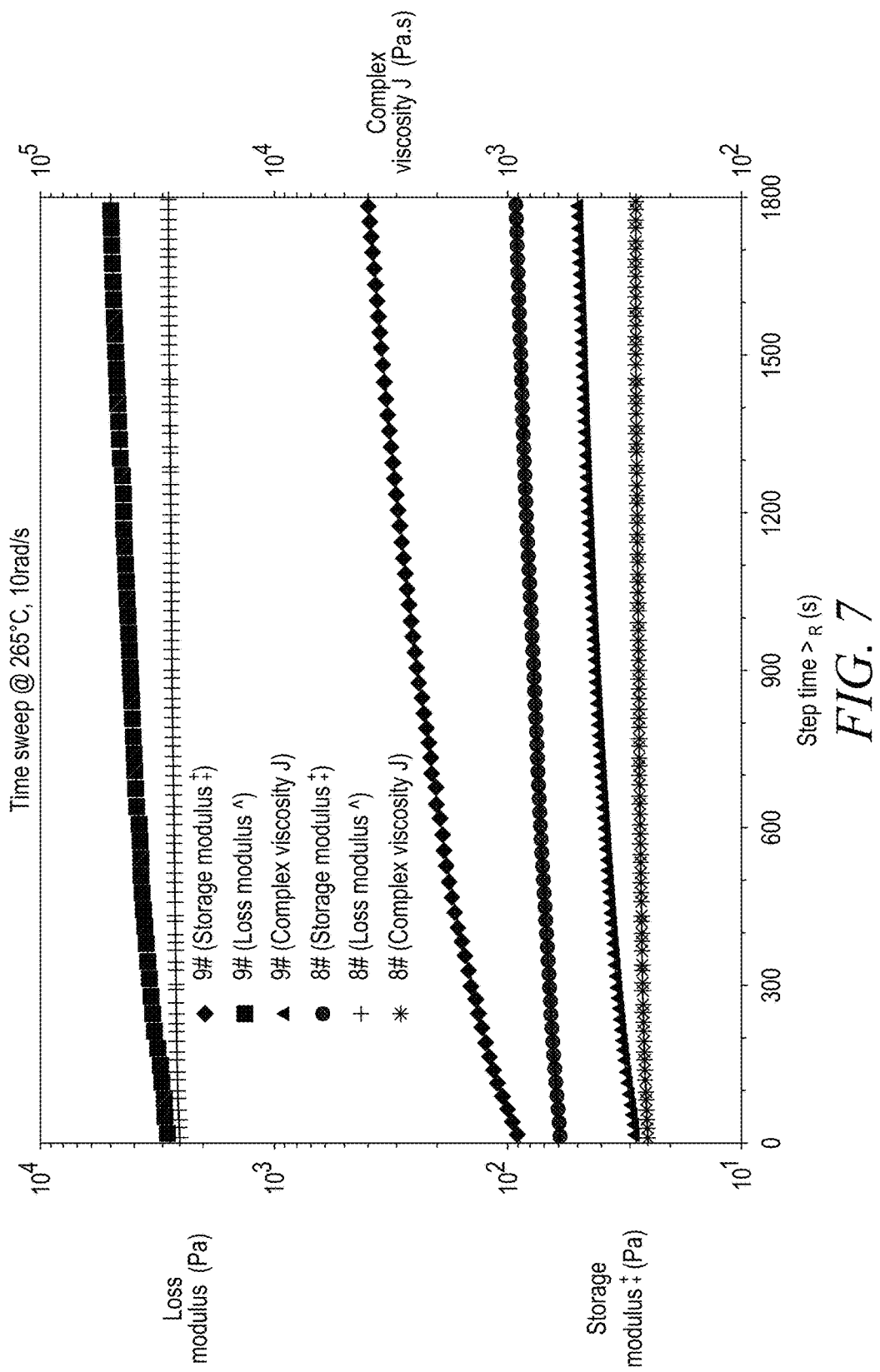
FIG. 7 is related to Example 1 and illustrates the rheological thermal stability of various PA-6 resins.

Rheology samples of the Samples of the mono-terminated Comparative Example 9# and dual-terminated Example 8# resins were then tested using a time sweep at 265° C. and 10 rad/s for 30 minutes. The results are shown in FIG. 7. As shown in FIG. 7, even though both materials had a similar initial viscosity, the mono-terminated resin had a much faster increase of storage modulus G', loss modulus G" and complex viscosity η* compared to the dual-terminated resin. This further supports the dual-terminated PA material being more thermally stable than the tested mono-terminated PA material.

Example 2

PA-6 Fiber Spinning Trials

Dual-terminated PA-6 resin having an RV of 2.83, 0.6% extractable content, and 600 ppm $H_2O$ was successfully spun according to the conditions in Table 2.

TABLE 2

| | Spinning conditions | | | | | |
|---|---|---|---|---|---|---|
| | Trial 1 | Trial 2 | Trial 3 | Trial 4 | Trial 5 | Trial 6 |
| Spinning duration | 84 hr | 48 hr | 120 hr | 24 hr | 168 hr | 168 hr |
| Fiber type | FDY | FDY | HOY | HOY | FDY | FDY |
| Fiber spec | 40/24 | 70/42 | 30/12 | 48/24 | 40/12 | 40/24 |
| Denier per filament | 1.7 | 2.9 | 2.5 | 2 | 3.3 | 1.7 |
| Spinning speed | 4500 m/min | 4500 m/min | 4500 m/min | 4500 m/min | 5000 m/min | 5000 m/min |
| Spinning temp. | 270° C. | 270° C. | 260-270° C. | 280° C. | 270° C. | 270° C. |
| Yarn shape | Tri-lobal | Tri-lobal | Concave triangle | Concave triangle | Tri-lobal | Tri-lobal |
| AA % | 97% | 98% | Greater than 90% | 100% | 91.4% | 92.0% |

As shown in Table 2, the dual terminated PA-6 resin provided good spinnability. In addition, the dual-terminated PA-6 resin provided a high percentage of best quality fibers, as indicated by the relatively high AA %.

The tenacity and elongation of various tri-lobal fibers were tested according to Test Standard GB14344, by using Instron equipment, under 23° C., 50 RH. The FDY fiber by using our dual-terminated Example 8# had a required minimum tenacity of 3.8 cN/dtex and minimum elongation of 35%. The HOY fiber and POY fiber had a required minimum tenacity of 3.8 cN/dtex and an elongation range of 57-63%. The results are provided in Table 3.

TABLE 3

| | Fiber physical properties | | | |
|---|---|---|---|---|
| | Fiber type | Fiber spec | Tenacity (cN/dtex) | Elongation (%) |
| Mono-terminated Ex. 9# | FDY | 100D/36F | 3.87 | 35.8 |
| Dual-terminated Ex. 8# | FDY | 100D/36F | 4.1 | 44 |
| Dual-terminated Ex. 8# | FDY | 70D/24F | 4.36 | 36 |
| Dual-terminated Ex. 8# | FDY | 40D/24F | 4.24 | 38 |
| Dual-terminated Ex. 8# | HOY | 30D/12F | 4.17 | 60.20 |
| Dual-terminated Ex. 8# | POY | 48D/24F | 4.1 | 58.90 |
| Dual-terminated Ex. 8# | FDY | 40D/12F | 4.3 | 36 |
| Dual-terminated Ex. 8# (Trial 6) | FDY | 40D/24F | 4.4 | 37 |

As shown in Table 3, each fiber met the minimum requirements. In addition, the dual-terminated fiber had better tenacity and elongation than the comparable mono-terminated fibers.

The tri-lobal dual-terminated FDY PA fibers was also tested for unevenness, oil content, and hot water shrinkage according to China Textile Industry Standard, under 23° C., 50 RH. The results are provided in Table 4.

TABLE 4

| | 70D/24F | 40D/24F | 40D/12F | 40D/24F (Trial 6) | Required value |
|---|---|---|---|---|---|
| Fiber physical properties | | | | | |
| Unevenness | 0.95% | 1% | 0.8% | 0.9% | less than or equal to 1.1% |
| Oil content | 0.8% | 11% | 1% | 1% | 0.8% to 1.2% |
| Hot water shrinkage | 12.22% | 11.42% | 12% | 11% | 8% to 15% |

As shown in Table 4, each yarn met the minimum requirements.

Figure 8A:
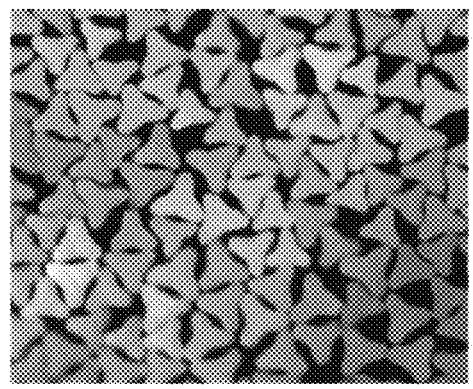
FIG. 8A is related to Example 2 and illustrates an end-view of 70D/24F tri-lobal fibers spun from dual-terminated PA-6 material.
Figure 8B:
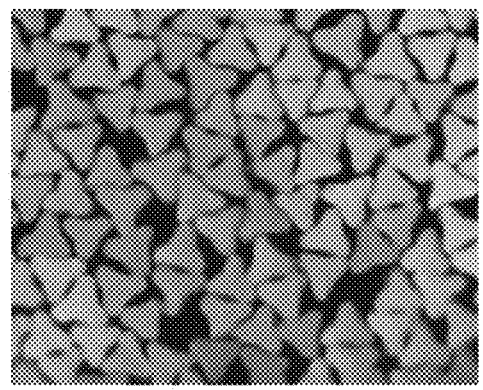
FIG. 8B is related to Example 2 and illustrates an end-view of 40D/24F tri-lobal fibers spun from dual-terminated PA-6 material.

An end-view of the tri-lobal fibers of a 70D/24F and 40D/24F fabric are illustrated in FIGS. 8A and 8B, respectively. Both sets of fibers indicated that the dual-terminated PA material maintained the tri-lobal shape, thus give the super shinning as silk.

Figure 8C:
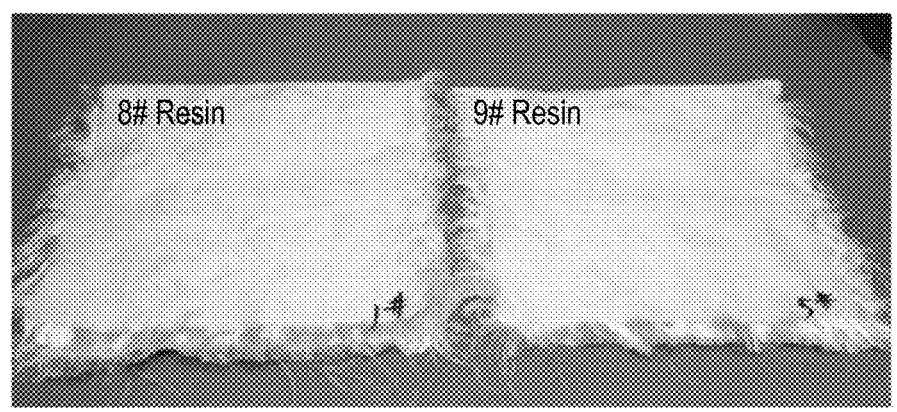
FIG. 8C is related to Example 2 and illustrates a comparison of a fabric formed from the dual-terminated PA-6 material with a 100D/36F fabric formed from a mono-terminated PA-6 material.

A comparison of the Example 8# with a 100D/36F fabric woven by Example 9# supplier commercial super shinning tri-lobal fiber is shown in FIG. 8C. As shown in FIG. 8C, the dual-terminated PA Example 8# material had similar shininess compared to 9# supplier produced as high quality super shinning fiber recognized by market.

Example 3

Dyed Fabric and Woven Fabric

More than 20 fiber bobbins were knitted together to form long hosiery, then put it in the dyeing tank to dye under 96° C., for 30 min, then to compare the dyeing uniformity under standard light box according to China Textile Industry Standards.

Figure 9A:
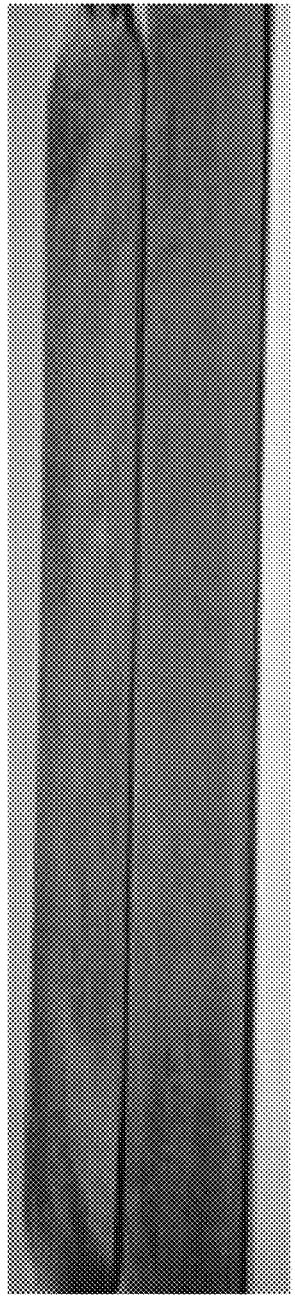
FIGS. 9A and 9B are related to Example 3 and illustrate dyed bobbins of material spun from dual-terminated PA-6 resin.
Figure 9B:
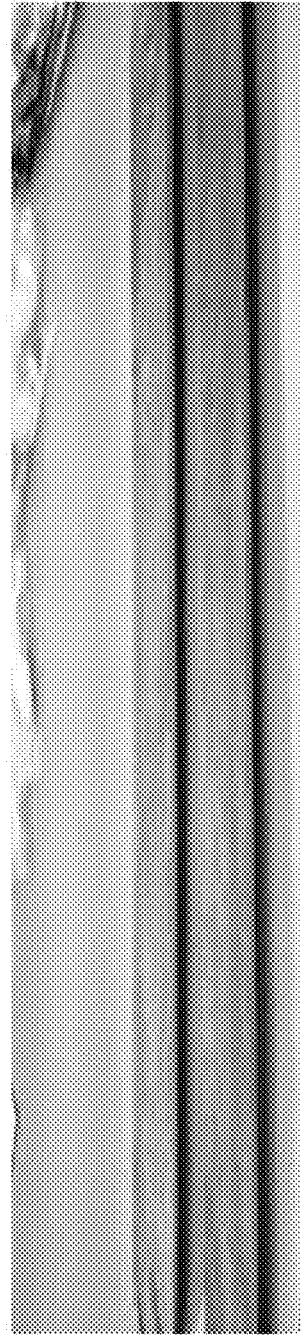

As shown in FIGS. 9A and 9B, the dual-terminated PA material provided uniform dyeing, and gray card comparison ratings greater than >4.5 test in the laboratory.

Figure 15:
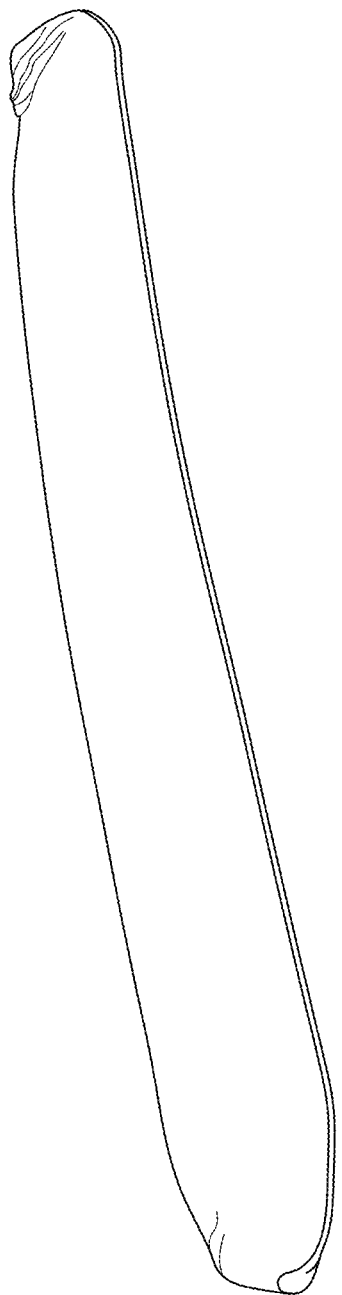
FIG. 15 is related to Example 3 and illustrate dyed bobbins of 40D/24F tri-lobal fibers material spun from dual-terminated PA-6 resin.

As further shown in FIG. 15, the 40D/24F dual-terminated PA material provided uniform dyeing, and gray card comparison ratings of about 4.5 test in the laboratory.

Referring next to FIGS. 10-12, woven fabric formed from the dual-terminated PA material was evaluated.

FIG. 10A illustrates a yellow satin 40/24 fabric. The warp was formed with tri-lobal fiber, as shown in FIG. 10B, while the weft was formed with round fiber, as shown in FIG. 10C. As shown in FIG. 10A, the woven fabric was observed to have good shininess, lighting, and the tri-lobal fiber maintained the shape following weaving. Shininess and the lighting effect of the woven fabric were measured by a visual examination by a user. The cross-section of the fiber was also examined to not only determine whether the tri-lobal fiber maintained its shape following weaving, but also to determine the extent of shining to be expected from the material (i.e., if the cross section of the fiber is tri-lobal and more uniform, a better shining effect of the fabric is expected).

FIG. 11A illustrates a gray plain 70/24 fabric. The warp was formed with tri-lobal fiber, as shown in FIG. 11B, while the weft was also formed with tri-lobal fiber, as shown in FIG. 11C. As shown in FIG. 11A, the woven fabric had good shininess, lighting, and the tri-lobal fiber maintained the shape following weaving.

FIG. 12A illustrates a pink plain 40/24 fabric. The warp was formed with tri-lobal fiber, as shown in FIG. 12B, while the weft was also formed with tri-lobal fiber, as shown in FIG. 12C. As shown in FIG. 12A, the woven fabric had good shininess, lighting, and the tri-lobal fabric maintained the shape following weaving.

Figure 13A:
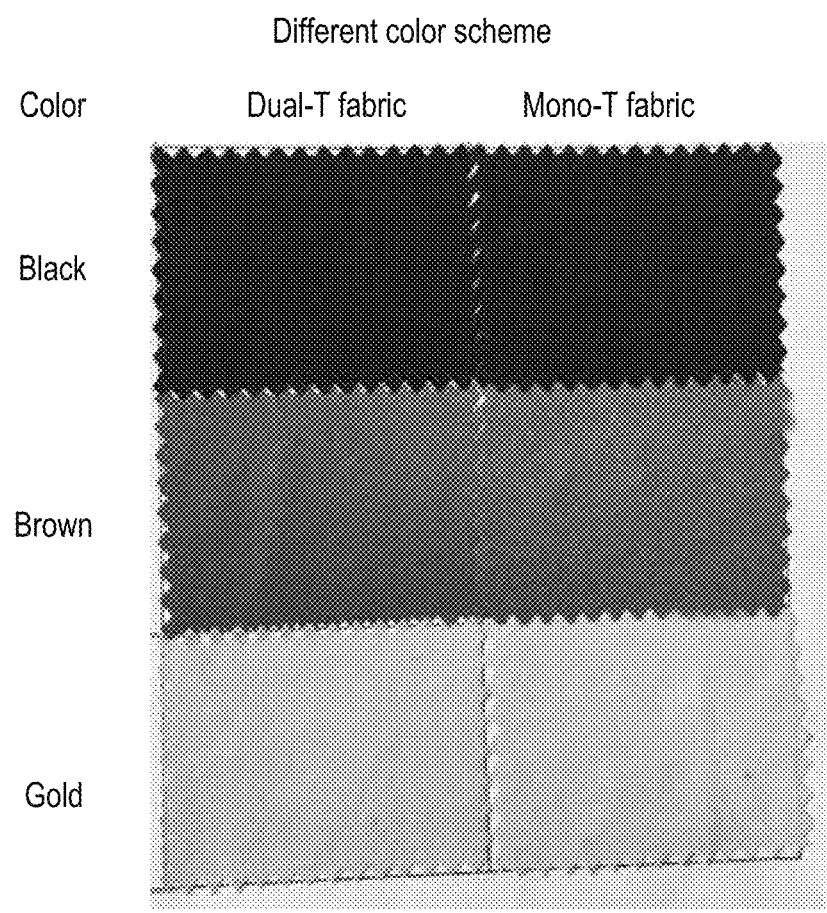
FIGS. 13A and 13B are related to Example 3 and illustrate a comparison of dyed material formed from dual-terminated PA-6 and dyed material formed from mono-terminated PA-6.
Figure 13B:
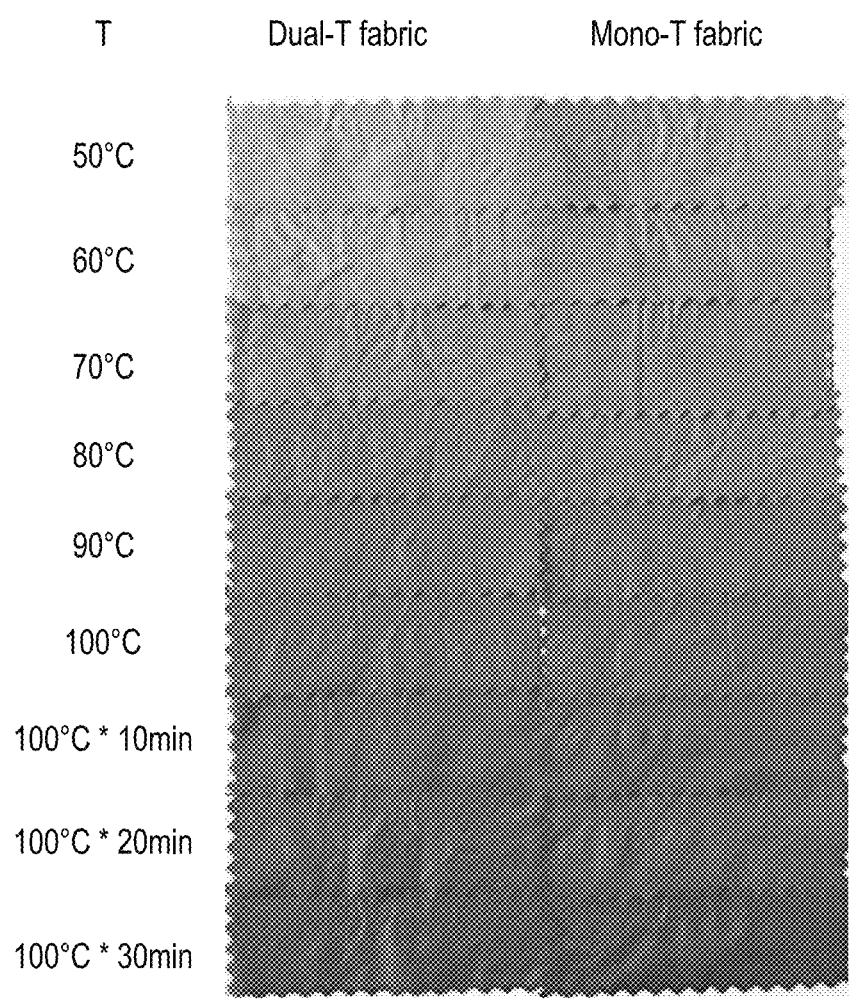
Figure 14A:
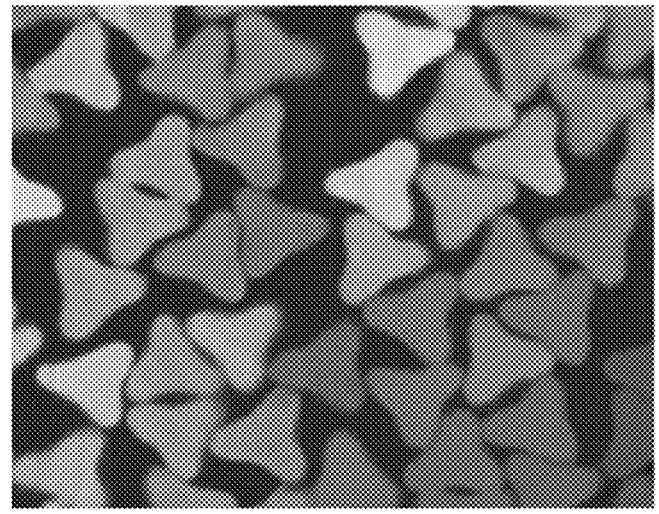
FIG. 14A is related to Example 2 and illustrates an end-view of 40D/12F tri-lobal fibers spun from dual-terminated PA-6 material.
Figure 14B:
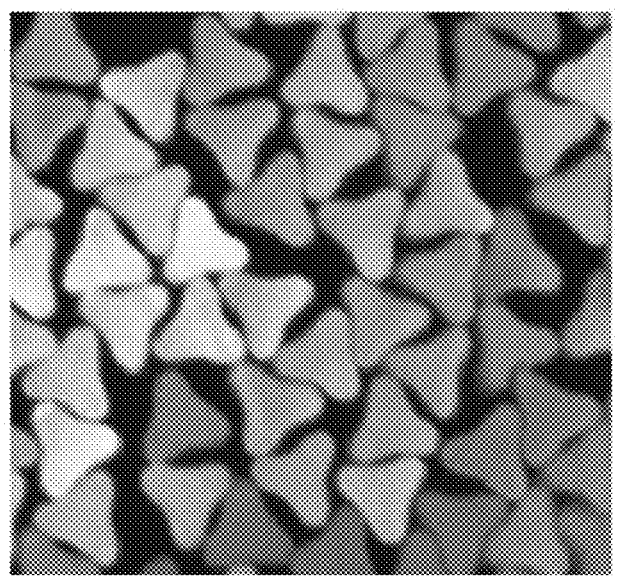
FIG. 14B is related to Example 2 and illustrates an end-view of 40D/24F tri-lobal fibers spun from dual-terminated PA-6 material.

Referring next to FIGS. 13A and 13B, the woven fabric formed from the dual-terminated PA material was evaluated against a comparable mono-terminated PA material in a dyeing experiment. The results are provided in FIGS. 13A and 13B. For color comparison as 13A, equivalent color property by visual check. And for dyeing experiment at different temperature, very similar dyeing property observed, since usually dyeing temperature is about 90-100° C. As shown in FIGS. 13A and 13B, the mono-terminated PA material has equivalent dyeing properties compared to typical mono-terminated PA materials.

While the present disclosure is primarily directed to high-speed spinning applications, it should be understood that the features disclosed herein may have application to other spinning and extrusion processes, including low-speed spinning, such as carpet fiber spinning, and medium speed spinning, such as conventional spinning.

While this invention has been described as relative to exemplary designs, the present invention may be further modified within the spirit and scope of this disclosure. Further, this application is intended to cover such departures from the present disclosure as come within known or customary practice in the art to which this invention pertains.

What is claimed is:

1. A method of producing a plurality of fibers, the method comprising:
    providing a dual-terminated polyamide-6 (PA-6) having an amine endgroup concentration of 25 mmol/kg to 40 mmol/kg, a carboxyl endgroup concentration of 18 mmol/kg to 50 mmol/kg, and a relative viscosity of 2.6 RV to 3.0 RV; and
    spinning the dual-terminated polyamide-6 (PA-6) at a speed of 3500 m/min to 8000 m/min to form the fibers.

2. The method of claim 1, wherein spinning includes heating the dual-terminated polyamide-6 (PA-6) to a temperature of 230° C. to 300° C.

3. The method of claim 1, wherein spinning includes extruding the dual-terminated polyamide-6 (PA-6) through a spinneret including tri-lobal shape holes, wherein the tri-lobal shape holes define an R value of 0 to 0.1 mm.

4. The method of claim 1, wherein the polyamide fibers each comprises a plurality of filaments, and the polyamide fibers have a denier per filament of 1.5 to 5.

5. The method of claim 1, wherein the dual-terminated polyamide-6 (PA-6) includes amine endgroups and carboxyl endgroups with different, chemically distinct terminators.

6. The method of claim 1, wherein the dual-terminated polyamide-6 (PA-6) has an amine endgroup concentration of 27 mmol/kg to 37 mmol/kg.

7. The method of claim 1, wherein the dual-terminated polyamide-6 (PA-6) has an amine endgroup concentration of 30 mmol/kg to 35 mmol/kg.

8. The method of claim 1, wherein the dual-terminated polyamide-6 (PA-6) has a carboxyl endgroup concentration of 20 mmol/kg to 40 mmol/kg.

9. The method of claim 1, wherein the dual-terminated polyamide-6 (PA-6) has a carboxyl endgroup concentration of 22 mmol/kg to 30 mmol/kg.

10. The method of claim 1, wherein the dual-terminated polyamide-6 (PA-6) has a relative viscosity of 2.7 RV to 3.0 RV.

11. The method of claim 1, wherein the dual-terminated polyamide-6 (PA-6) has a relative viscosity of 2.8 RV to 3.0 RV.

12. The method of claim 1, wherein the dual-terminated polyamide-6 (PA-6) has a polydispersity index less than 1.8.

13. The method of claim 1, wherein the dual-terminated polyamide-6 (PA-6) has an extractables content of less than 0.8 wt. %.

14. The method of claim 1, wherein prior to the spinning step, the dual-terminated polyamide-6 (PA-6) is heated to a temperature of 240° C. to 300° C.

15. The method of claim 1, wherein prior to the spinning step, the dual-terminated polyamide-6 (PA-6) is heated to a temperature of 250° C. to 290° C.

16. The method of claim 1, wherein the spinning step is carried out at a speed of 4000 m/min to 6000 m/min.

17. The method of claim 4, wherein the polyamide fibers each comprises a plurality of filaments, and the polyamide fibers have a denier per filament of 1.7 to 5.

18. The method of claim 4, wherein the polyamide fibers each comprises a plurality of filaments, and the polyamide fibers have a denier per filament of 1.7 to 3.

\* \* \* \* \*